United States Patent
De La Chevasnerie et al.

(10) Patent No.: US 12,184,148 B2
(45) Date of Patent: Dec. 31, 2024

(54) LINEAR MOTOR SYSTEM GUIDE

(71) Applicant: Goodrich Actuation Systems SAS, Saint ouen l'Aumone (FR)

(72) Inventors: Arnaud De La Chevasnerie, Ville d Avray (FR); Benjamin Legrand, Versailles (FR)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 296 days.

(21) Appl. No.: 17/829,843

(22) Filed: Jun. 1, 2022

(65) Prior Publication Data

US 2022/0407381 A1    Dec. 22, 2022

(30) Foreign Application Priority Data

Jun. 18, 2021    (EP) .................................... 21305842

(51) Int. Cl.
*H02K 5/173* (2006.01)
*F16C 19/26* (2006.01)
*F16C 33/66* (2006.01)

(52) U.S. Cl.
CPC ............. *H02K 5/173* (2013.01); *F16C 19/26* (2013.01); *F16C 33/6637* (2013.01)

(58) Field of Classification Search
None
See application file for complete search history.

(56) References Cited

U.S. PATENT DOCUMENTS

| | | | |
|---|---|---|---|
| 2,907,610 A * | 10/1959 | Wise ...................... | A47H 15/02 384/55 |
| 3,347,603 A | 10/1967 | Ignatjev | |
| 6,568,853 B2 * | 5/2003 | Mochizuki .............. | B23Q 1/40 384/58 |
| 2005/0180737 A1 * | 8/2005 | Kurita .................. | F16C 29/045 257/E21.001 |
| 2009/0279814 A1 * | 11/2009 | Yang ...................... | F16C 29/04 384/44 |
| 2022/0166302 A1 * | 5/2022 | Lin ....................... | H02K 41/031 |

FOREIGN PATENT DOCUMENTS

| | | |
|---|---|---|
| CN | 201928118 U | 8/2011 |
| CN | 109428431 A | 3/2019 |
| EP | 1225352 A1 | 7/2002 |

(Continued)

OTHER PUBLICATIONS

Abstract for CN109428431 (A), Published: Mar. 5, 2019, 1 page.

(Continued)

*Primary Examiner* — Bernard Rojas
(74) *Attorney, Agent, or Firm* — CANTOR COLBURN LLP

(57) ABSTRACT

A guide assembly includes an annular guide body defining a cavity, and a plurality of roller assemblies mounted within the guide body. Each roller assembly includes an annular roller mounted onto a pin and arranged to rotate around the pin. The pins are arranged such that their axes define a ring around the interior of the guide body and the annular rollers arranged to protrude through respective openings in the guide body into the cavity. Each annular roller has a concave outer surface.

8 Claims, 6 Drawing Sheets

(56) References Cited

FOREIGN PATENT DOCUMENTS

| EP | 1564791 A2 | 8/2005 |
|----|------------|--------|
| EP | 1564791 A3 | 8/2006 |
| JP | 2003056563 A | 2/2003 |
| WO | 2017122990 A1 | 7/2017 |

OTHER PUBLICATIONS

Abstract of CN201928118 (U), Published: Aug. 10, 2011, 1 page.
Abstract of JP2003056563 (A), Published: Feb. 26, 2003, 1 page.
European Search Report for Application No. 21305842.3, mailed Nov. 18, 2021, 7 pages.

* cited by examiner

LINEAR MOTOR SYSTEM GUIDE

CROSS REFERENCE TO RELATED APPLICATIONS

This application claims priority to European Patent Application No. 21305842.3 filed Jun. 18, 2021, the entire contents of which is incorporated herein by reference.

TECHNICAL FIELD

The present disclosure relates to guide assemblies for linear motors e.g. for use as linear actuators.

BACKGROUND

Linear motor systems comprise a motor stator defining a cylindrical cavity and a translator or linear element positioned within, and axially movable along the cavity. A magnetic air gap is defined along the cavity between the translator and the stator and the translator is caused to move axially relative to the stator. Bearings or guides are provided between the stator and the translator to ensure and maintain coaxiality and, therefore, concentric location of the translator relative to the stator.

The linear motor is, however, very sensitive to any eccentricity between the translator and the stator. As soon as there is any misalignment between the stator and the translator, a magnetic attraction causes a radial load on the translator. This results in an actual load that introduces friction into the system at the guide bearings.

There is, therefore, a need for an improved guide system for a linear motor.

SUMMARY

According to the disclosure, there is provided a guide assembly comprising an annular guide body defining a cavity, and a plurality of roller assemblies mounted within the guide body, each roller assembly comprising an annular roller mounted onto a pin and arranged to rotate around the pin, the pins arranged such that their axes define a ring around the interior of the guide body and the annular rollers arranged to protrude through respective openings in the guide body into the cavity, whereby each annular roller has a concave outer surface.

Also according to the disclosure, there is provided a linear motor assembly comprising a cylindrical stator defining a stator cavity and a translator extending through and axially movable relative to the cavity, and one or more guide assemblies as claimed in any preceding claim arranged around the translator such that the translator passes through the cavity of the guide body and the concave outer surface of the roller assemblies is in rolling contact with the translator.

BRIEF DESCRIPTION

Some examples of a guide assembly according to the disclosure will be described with reference to the drawings.

DETAILED DESCRIPTION

Figure 1:
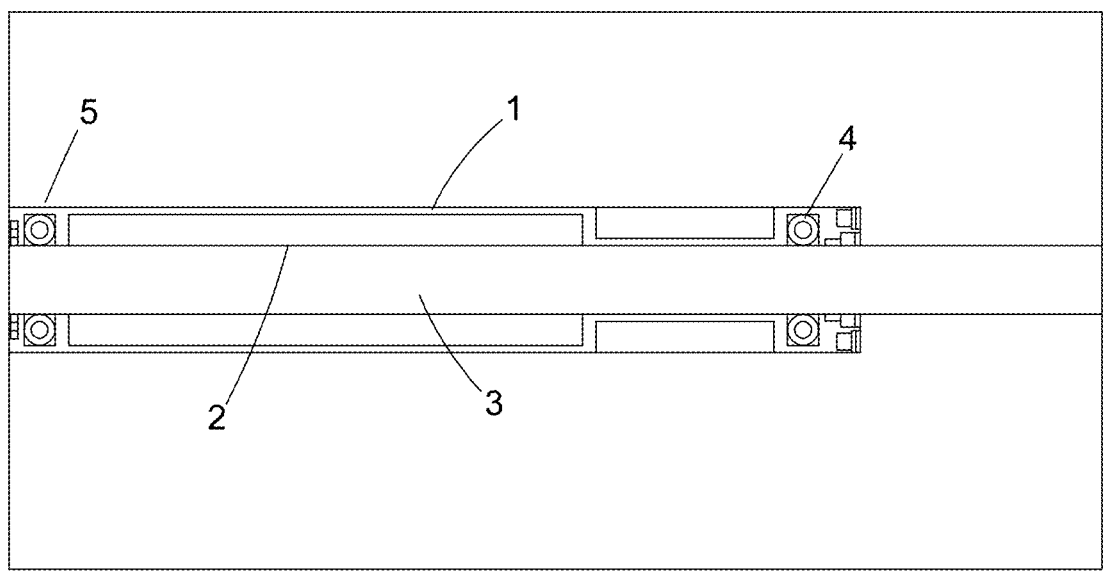
FIG. 1 shows an example of a linear motor in which a guide assembly according to the disclosure can be provided.
Figure 2A:
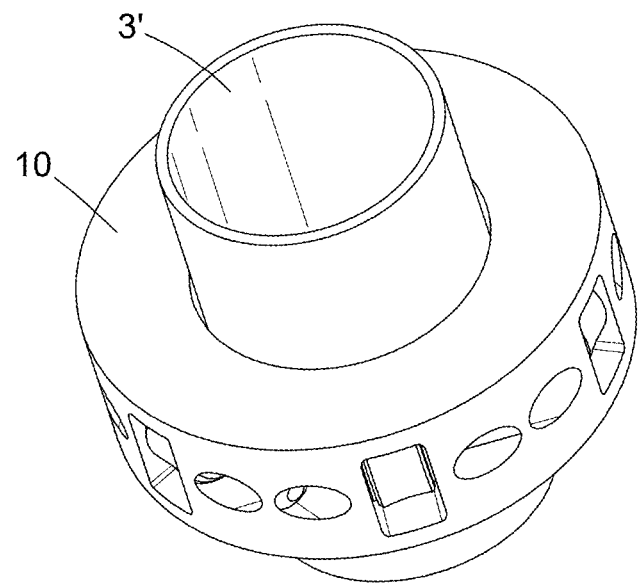
FIG. 2A is a perspective view of a guide assembly according to the disclosure.
Figure 2B:
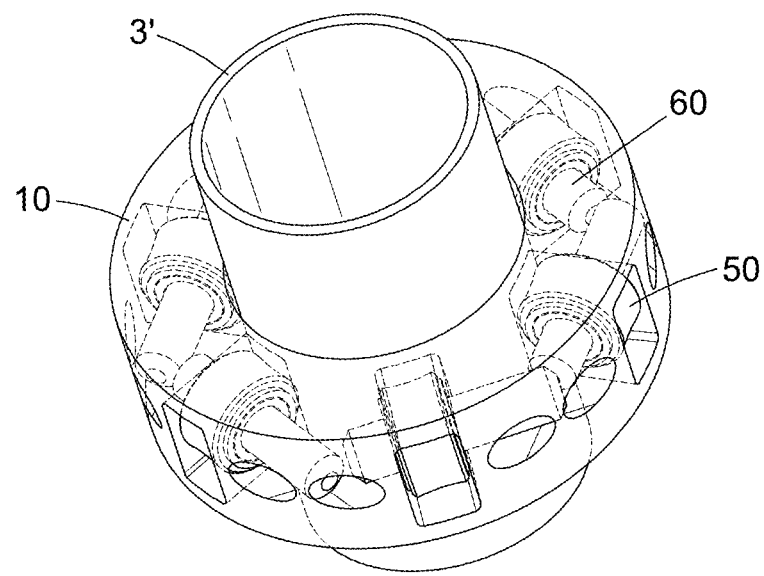
FIG. 2B is a view showing the interior of the guide assembly of FIG. 2A.
Figure 3:
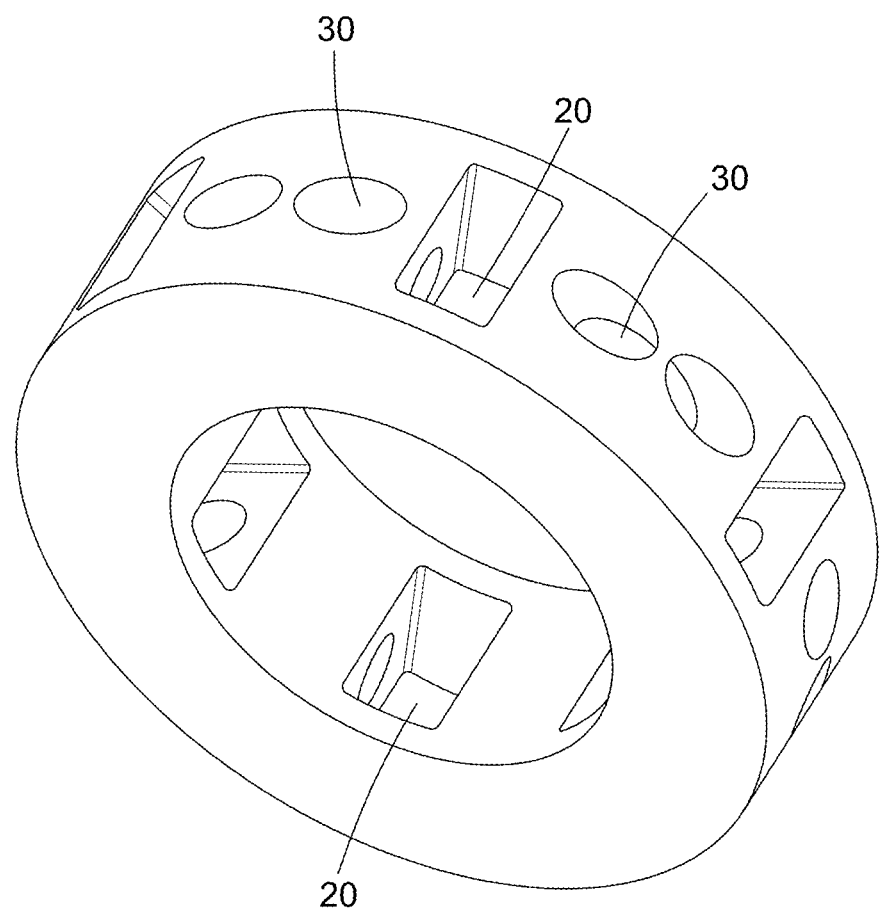
FIG. 3 shows a body component of a guide assembly according to the disclosure.
Figure 4:
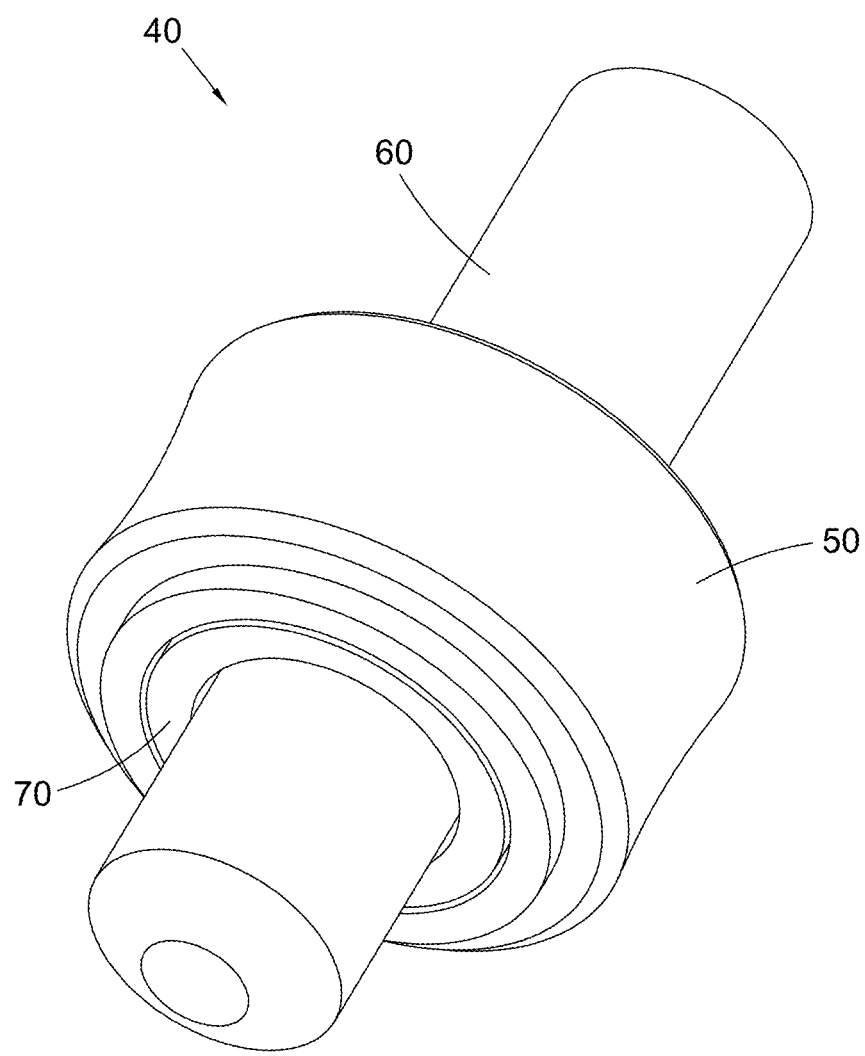
FIG. 4 shows a roller assembly for a guide assembly according to the disclosure.

Referring first to FIG. 1, a linear motor assembly will be briefly described. Such motor arrangements are, however, known in the art and will not be described in detail.

The linear motor comprises a stator 1 that defines a cylindrical cavity 2 in which a translator 3 is mounted, extending in and movable relative to the stator, in an axial direction A. Guides 4,5 are provided to maintain the coaxial location of the translator relative to the stator. In the example shown a front guide 4 and a rear guide 5 are shown although one or more guides may be provided at different locations along the length of the translator 3. Conventionally, guides are in the form of a simple bushing or ring which have to provide a very tight fit and use friction pads. These pads provide a friction of around 20% of the radial load. The current pads usually have a very thin inner coating of a special plastic and the coefficient of friction can vary due to temperature, humidity etc. Further, it is not permissible to have lubricant around the guides in many applications. The wear of the pads may be uneven due to varying radial loads, which can lead to further eccentricity and accelerate failure of the system.

The guide assembly of the present disclosure, which provides improved guiding of the translator and better maintains a concentric positioning of the translator, will be described in more detail with reference to FIGS. 2 to 7.

The guide assembly comprises an annular guide body 10 arranged to fit around the circumference of a translator rod 3'. The inner diameter of the guide body 10 is slightly larger than the outer diameter of the translator 3'. A number of roller openings 20 are provided around the guide body 10, extending through the radial depth of the body from the outer circumference to the inner circumference of the body. Insert openings 30 are also provided in the outer circumference of the body, each roller opening 20 having an insert opening 30 either side of it in the circumferential direction. The insert openings define insert channels that open into the respective roller openings part way through the depth of the body 10.

A roller assembly 40, described in more detail below, is fitted into each set of a roller opening and a pair of insert openings one on either side of the roller opening. A plurality of roller assemblies form a ring around the inside of the guide body 10 such that, as described below, a plurality of rollers 50 protrude from the roller openings into the interior of the cavity defined by the annular guide body 10 to contact the translator 3'. The roller assemblies are mounted in the body such that each roller is at the same radial distance from the central axis C of the guide body 10.

Each roller assembly 40 comprises an annular roller 50 defining a cavity, a pin 60 extending axially through the cavity, and a bearing 70 located radially between the pin and the roller. The rollers rotate about the pins via the bearings. Grease as a lubricant can be integrated in the bearing 70.

Figure 7:
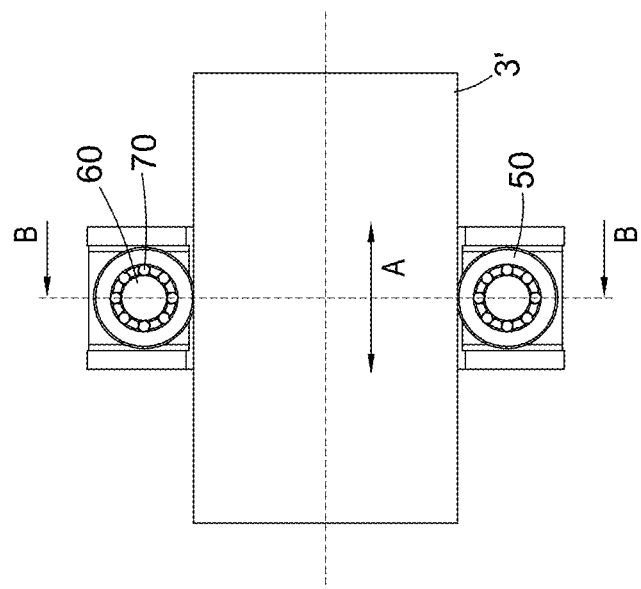
FIG. 7 shows an alternative section through the assembly shown in FIGS. 2A and 2B
Figure 6:
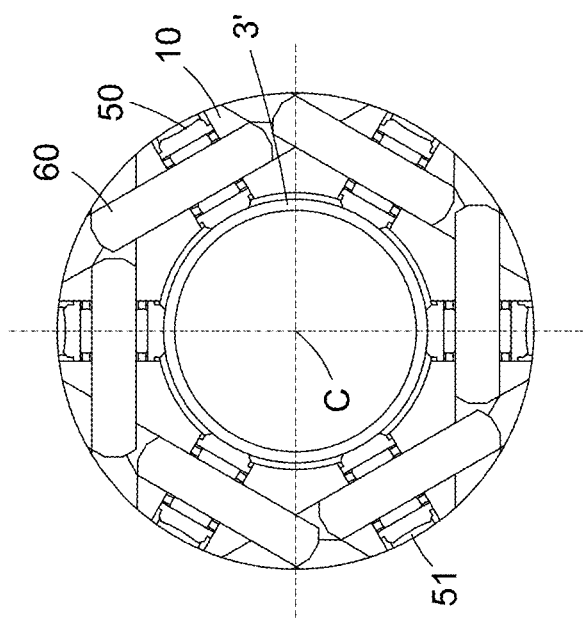
FIG. 6 shows a section through the assembly shown in FIGS. 2A and 2B.

As best seen in FIGS. 6 and 7, each roller 50 is positioned, with a bearing 70 mounted therein, in a respective roller opening of the guide body and a pin 60 is pushed through an adjacent insert opening, through the channel and through the cavity of the bearing and back through the insert opening on the other side of the roller opening. The pins therefore extend radially around the inside of the guide body 10 and the rollers rotate about the axes of their respective pins via their respective bearings with their rolling outer surface protruding through the roller openings to contact the translator 3' about which the guide body 10 is fitted.

Each roller 50 is formed with a concave outer profile 51 as best seen in FIG. 6 i.e. the rolling outer surface that contacts the translator is concave in the guide body circumferential direction. The rolling outer surfaces are therefore shaped to better match the outer surface of the translator 3'. The concave shape of the rollers reduces the friction between the guide and the translator by a magnitude of around 10, thus reducing the risk of uneven wear on the guide components when unequal radial forces are present in the system.

Thus, as seen, for example, in the cross section of FIG. 7, as the translator 3' moves in the axial direction A, the guide system acts to keep the translator coaxial with respect to the stator with the rollers 50 rotating about the pins 60 with their concave surfaces 51 in guiding contact with the translator 3'.

Figure 5:
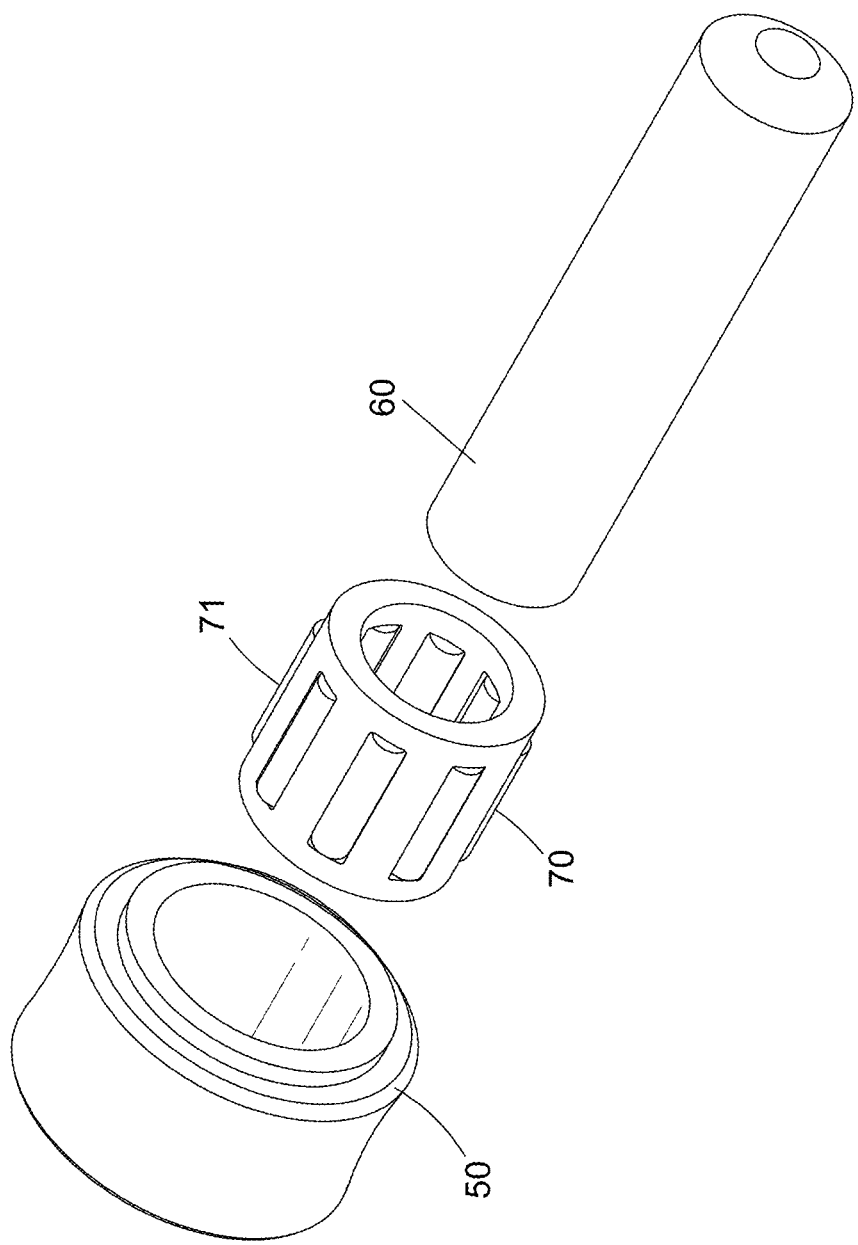
FIG. 5 is an exploded view of the roller assembly of FIG. 4.

In the example shown, as best seen in FIG. 5, the pins 60 may have a diameter of, say, 5-6 mm, the bearing may comprise 7 or 8 bearing needles 71 with a diameter of, say, 1.5 mm and a length of, say, 5.8 mm. The roller 50 has, say, a minimum thickness of 2 mm and a radius of curvature slightly above (+0.5 mm) the outer radius of the translator (e.g. 17.5 mm). In the example shown, the guide has six roller assemblies mounted around the guide body 10. Of course, other numbers and dimensions may be used depending on the application.

Because the guide assembly comprises rolling parts that contact the translator, friction and stress is minimised, and this is further reduced due to the concave roller surface. The assembly also makes it possible to incorporate a lubricant into a closed bearing part.

The invention claimed is:
1. A guide assembly comprising:
   an annular guide body defining a cavity, the guide body including roller openings that open into the cavity and are surrounded by inert openings formed in an outer circumference of the annual guide body in the circumferential direction; and
   a plurality of roller assemblies mounted within the guide body, each roller assembly comprising:
      an annular roller mounted onto a respective separate pin and arranged to rotate around the respective separate pin, the respective separate pins arranged such that their axes define a ring around the interior of the guide body;
      wherein the annular rollers are arranged to protrude through respective roller openings in the guide body into the cavity;
      wherein the respective pins are arranged to extend radially through the insert openings adjacent to the respective roller openings in the guide body and through respective annular rollers to hold the annular rollers in position.
2. The guide assembly of claim 1, wherein each roller assembly further comprises a bearing between the roller and the pin.
3. The guide assembly of claim 2, further comprising lubricant in the bearing.
4. The guide assembly of claim 2, the rollers positioned around the guide body such that the outer surface of all rollers are located the same radial distance from a central axis through the cavity.
5. The guide assembly of claim 2, the plurality of annular roller assemblies includes six annular roller assemblies equally spaced around the guide body.
6. The guide assembly of claim 1, the rollers positioned around the guide body such that the outer surface of all rollers are located the same radial distance from a central axis through the cavity.
7. The guide assembly of claim 1, the plurality of annular roller assemblies includes six annular roller assemblies equally spaced around the guide body.
8. A linear motor assembly comprising:
   a cylindrical stator defining a stator cavity;
   a translator extending through and axially movable relative to the cavity; and
   one or more guide assemblies as claimed in claim 1 arranged around the translator such that the translator passes through the cavity of the guide body and the concave outer surface of the roller assemblies is in rolling contact with the translator.

* * * * *